United States Patent Office 2,981,573
Patented Apr. 25, 1961

2,981,573
BEARINGS OF PLASTICS

Franz Gottfried Reuter, Lemforde, Hann, Germany, assignor, by mesne assignments, to Mobay Chemical Company, Pittsburgh, Pa., a corporation of Delaware Filed June 19, 1956, Ser. No. 592,449

Claims priority, application Germany June 21, 1955

1 Claim. (Cl. 308—36.1)

This invention relates to bearings made of plastics. More particularly, the invention is concerned with plastic bearings in which the contact surface and the seal are integral.

Bearings made of plastics, which as a rule require no lubrication, are well known in the art. Such bearings have various advantages over metal bearings. Thus, they operate very quietly and have a long working life. Furthermore, they can be installed in a very easy manner. However, if the bearings are to be sealed, sealing rings, such as Simmer rings, must be used which require an extremely precise manufacture of the machine part to be held by the bearing. On the other hand, the openings in the journal box or housing must be tooled very precisely. The requirement of using parts of extremely precise dimensions constitutes a very undesirable handicap and considerably increases the cost of the machines utilizing these bearings.

It is an object of the present invention to provide bearings of plastics which are particularly adapted for use in sealed systems. Another object is to provide bearings which do not require fine tooling of the machine parts used in connection therewith. A further object is to provide bearings which, in addition to the above-mentioned advantages, are of great durability. A still further object is to provide bearings which can be installed in a very easy manner. Still further objects will appear hereinafter.

With the above and other objects in view, the invention provides bearings made of plastics which comprise one piece of plastic forming the contact surface and the seal.

Figure 2:
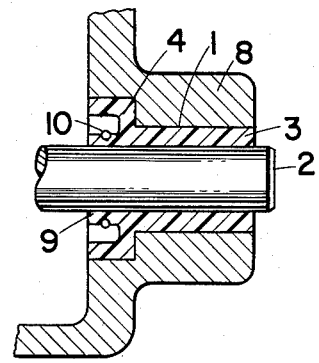
Figure 3:
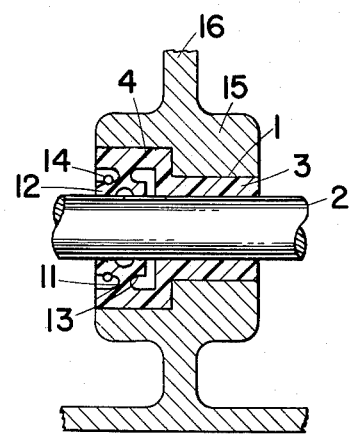
Figure 4:
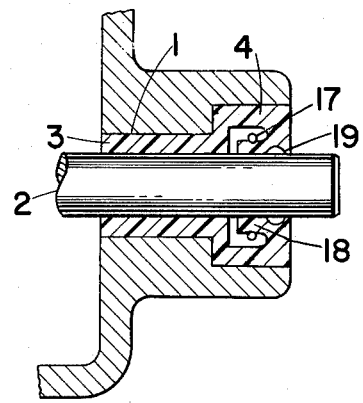

The bearings of the invention have the advantage of having an elastic seal. This means that the dimensions of the bore and of the moving part, such as the shaft, receiving the seal need not be precise. In other words, no exact tooling is required, the sealing and the bearing proper being elastic enough to compensate for small inaccuracies. Another attractive feature of the bearings of the invention is that they can be installed in a single operation, whereas heretofore the bearing and the sealing ring, such as the Simer ring, had to be installed in two subsequent operations. A "Simmer ring" is a circular tension spring used to urge the sealing ring of a bearing against the shaft or other rotating element. Examples of Simmer rings are shown in Figures 2 through 4 of the drawing.

In a specific embodiment of the invention, the surface element is made of a material which is harder and less elastic than the material forming the seal. Such bearings will have play-free, solid and sufficiently elastic bearing characteristics. At the same time, they will close very tightly because the seal, consisting of a more elastic material, can be made to cling to the shaft, or the like, without excessive braking action.

Although the bearings of the instant invention can be produced from a great many plastics, they are preferably made from polyurethane plastics because the latter possess a unique resistance to chemicals, which results in a high degree of durability. A very satisfactory method of producing the bearings of the invention involves the extrusion of reactive mixtures comprising a substantially linear hydroxyl polyester, a diisocyanate and a cross-linking agent. Reactive mixtures which will form suitable polyurethane plastics are described in greater detail in U.S. Patent 2,729,618.

In order to bring about different hardness and elasticity of the materials forming the surface element and the seal, a plasticizer may be added to the reactive mixture from which the seal is to be made. Alternatively, the mixture forming the seal may contain ingredients which react to form a more elastic material. Thus, in the case of polyurethane plastics, the nature of the hydroxyl polyester used will determine the degree of elasticity of the final product formed therefrom by reaction with a diisocyanate ad a cross-linking agent. It is preferable to make the surface element and the seal from the same type of material in order to bring about a firm bond between the two parts. This condition is met if both the seal and the surface element consist of polyurethane plastics.

In a specific embodiment of the invention, the diameter of the seal is larger than that of the surface element and the seal has on its inner surface an annular groove so proportioned that it provides two annular rings or ridges which, when assembled, make a pressure contact with the shaft, thereby providing a tight seal without excessive friction.

In another embodiment of the invention, the seal is made stronger than the bearing element and has the form of a Simmer ring, the lips of which either make tight contact with the moving part by reason of their own elasticity alone or supplemented with additional force, for example, by means of tension springs. In cases where two identical lips are used in order to form a symmetrical seal, the structure may also be provided with a tension spring. Whether or not tension springs are used will, of course, depend on the given pressure conditions which the seal is to withstand.

Several specific embodiments of the invention will now be described in detail, by way of example, with reference to the accompanying drawings, in which all figures are sectional views of bearings constructed in accordance with the present invention.

As may be seen from the drawing, the bearings of the invention consist of a unitary element 1 forming the bearing surface element 3 and the seal 4. Although the bearing element and the seal are preferably made of materials of different elasticity, these two parts form an integral unit since they are made of chemically related compounds and are fabricated independent of the assembly or in situ.

Figure 1:
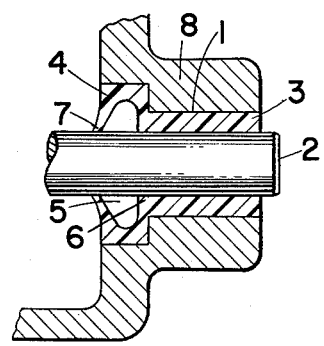

Referring more particularly to Figure 1, the seal 4 has an annular groove 5 on the interior surface in contact with the shaft 2 of such a width that annular projections 6 and 7 are formed. The opening formed by projection 7 is smaller than the diameter of the shaft 2 so that flange 7 will make a pressure contact with shaft 2 when the latter is installed, thus bringing about a tight seal. The bearing element is pressed or tightly fitted into the journal box 8.

In Figure 2, the seal 4 has the form of a Simmer ring comprising the lip 9 which is pressed against the shaft 2 by the tension spring 10. As in the embodiment represented in Figure 1, the bearing is mounted in a bearing housing 8.

In Figure 3, the seal 4 is formed by the annular projection 11 containing the sealing lips 12 and 13, lip 12 being equipped with the tension spring 14. By the use of two sealing lips (12 and 13), a symmetrical seal is effected.

The bearing 1 is fitted in the reinforcement 15 of the housing wall 16. As may be seen from Figure 3, this type of bearing makes it possible to seal two pressure spaces from one another.

In Figure 4, the seal 4 comprises the sealing lip 18 held by the tension spring 17 and the lip 19 effectively prevents the infiltration of dust, water or the like into the bearing surface.

Figure 5:
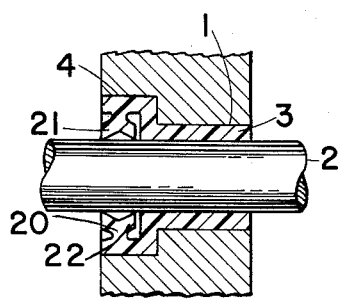

In Figure 5, the seal 4 comprises the annular projection 20 and the sealing lips 21 and 22 which are effective due to their shape and elasticity.

Having described my invention as related to the embodiments shown in the accompanying drawings, it is my intention that the invention be not limited by any of the details of description unless otherwise specified, but rather be construed broadly within its spirit and scope as set out in the accompanying claim.

What is claimed is:

A one-piece polyurethane plastic bearing assembly for a rotating element, one end of said assembly being a rigid polyurethane plastic sleeve having a bore adapted to fit loosely about said element, the other end of said assembly being an elastic polyurethane plastic seal of greater cross-section than the said sleeve, said seal being rectangular in cross-section and having an annular groove in the end thereof spaced from the sleeve, a second groove extending from the said bore and then towards the first said groove, said grooves forming an annular generally T-shaped lip having a surface adapted to fit snugly about the rotating element, said surface having an annular groove therein.

References Cited in the file of this patent

UNITED STATES PATENTS

| | | |
|---|---|---|
| 1,510,806 | Snider | Oct. 7, 1924 |
| 1,733,416 | Lebesnerois | Oct. 29, 1929 |
| 2,081,040 | King | May 18, 1937 |
| 2,356,027 | Boyd et al. | Aug. 15, 1944 |
| 2,431,921 | Cook et al. | Dec. 2, 1947 |
| 2,482,029 | Reynolds | Sept. 13, 1949 |
| 2,568,056 | Corder | Sept. 18, 1951 |
| 2,625,532 | Seeger | Jan. 13, 1953 |
| 2,681,257 | Niesemann | June 15, 1954 |
| 2,713,884 | Schwartz | July 26, 1955 |
| 2,730,518 | Birley et al. | Jan. 10, 1956 |
| 2,741,800 | Brockway | Apr. 17, 1956 |
| 2,764,565 | Hoppe et al. | Sept. 25, 1956 |
| 2,778,695 | Sturtevant | Jan. 22, 1957 |
| 2,879,114 | Bowen | Mar. 24, 1959 |
| 2,881,032 | Connolly | Apr. 7, 1959 |

FOREIGN PATENTS

| | | |
|---|---|---|
| 889,946 | France | Oct. 18, 1943 |
| 839,651 | Germany | May 23, 1952 |